United States Patent [19]

Minami et al.

[11] 4,328,328

[45] May 4, 1982

[54] CONTINUOUS PROCESS FOR PRODUCTION OF OLEFIN POLYMERS OR COPOLYMERS

[75] Inventors: Syuji Minami; Takashi Ueda; Mamoru Kioka, all of Ohtake; Norio Kashiwa, Iwakuni, all of Japan

[73] Assignee: Mitsui Petrochemical Industries Ltd., Tokyo, Japan

[21] Appl. No.: 100,098

[22] Filed: Dec. 4, 1979

[30] Foreign Application Priority Data

Dec. 11, 1978 [JP] Japan .................................. 53/151998

[51] Int. Cl.$^3$ .......................... C08F 4/64; C08F 10/02
[52] U.S. Cl. ................................ 526/125; 252/429 B; 526/141; 526/142; 526/348.4; 526/348.6; 526/348
[58] Field of Search ......................... 526/125, 141, 142

[56] References Cited

U.S. PATENT DOCUMENTS

| | | | |
|---|---|---|---|
| 3,859,231 | 1/1975 | Kochhar et al. | 526/125 |
| 4,071,674 | 1/1978 | Kashiwa et al. | 526/125 |
| 4,205,021 | 5/1980 | Morita et al. | 526/125 |

FOREIGN PATENT DOCUMENTS

| | | | |
|---|---|---|---|
| 1235062 | 6/1971 | United Kingdom . | |
| 1271411 | 4/1972 | United Kingdom . | |
| 1358437 | 7/1974 | United Kingdom | 526/124 |

*Primary Examiner*—Edward J. Smith
*Attorney, Agent, or Firm*—Sherman & Shalloway

[57] ABSTRACT

In a continuous process for producing a polymer or copolymer of an alpha-olefin in a hydrocarbon solvent in the presence of a catalyst comprising a transition metal compound and an organoaluminum compound, the improvement wherein

[I] polymerization or copolymerization is carried out in the presence of a catalyst composed of
   (A) a magnesium compound in the liquid state which is soluble in said hydrocarbon solvent and is free from an organoaluminum compound and a transition metal compound, said magnesium compound being obtained from specific reactants,
   (B) a transition metal compound in the liquid state, and
   (C) an organoaluminum compound, and

[II] said polymerization or copolymerization is carried out while feeding said compound (C) into a polymerization or copolymerization zone separately from said other compounds (A) and (B), or while adding a part or the whole of said compound (C) to a liquid mixture of said other compounds (A) and (B) and feeding the resulting mixture into said zone, or while feeding a mixture of the compounds (A), (B) and (C) into said zone.

9 Claims, No Drawings

CONTINUOUS PROCESS FOR PRODUCTION OF OLEFIN POLYMERS OR COPOLYMERS

This invention relates to a continuous process for producing an alpha-olefin polymer or copolymer. Particularly, this invention relates to an improved process for performing the aforesaid continuous polymerization or copolymerization of alpha-olefins using a catalyst composed of (A) a magnesium compound in the liquid state which is soluble in a hydrocarbon solvent and is free from an organoaluminum compound and a transition metal compound, (B) a transition metal compound in the liquid state, and (C) an organoaluminum compound, in such a manner that the catalyst component (C) is being fed into a polymerization or copolymerization zone separately from the catalyst components (B) and (C), or a part or the whole of the component (C) is added to a mixture of the components (A) and (B) and the resulting mixture is fed into the polymerization or copolymerization zone, or feeding a mixture of the compounds (A), (B) and (C) into said zone.

According to the process of this invention, complicated reactions required for the formation of a transition metal catalyst component supported on a carrier in the prior art can be omitted, and therefore, the use of an excessive amount of a transition metal compound is unnecessary and the generation of waste matter can be avoided. Thus, the process is advantageous in regard to cost and pollution control. There can also be obtained other advantages such as the increase in the yield of a polymer or copolymer, the narrow molecular weight distribution of the polymer or copolymer, the narrow distribution of composition and superior transparency of the copolymer.

More specifically, this invention provides in a process for producing a polymer or copolymer of an alpha-olefin which comprises continuously polymerizing or copolymerizing the alpha-olefin or the alpha-olefin with up to 5 mole% of a diolefin in a hydrocarbon solvent in the presence of a catalyst comprising a transition metal compound and an organoaluminum compound, the improvement wherein

[I] said polymerization or copolymerization is carried out in the presence of a catalyst composed of
  (A) a magnesium compound in the liquid state which is soluble in said hydrocarbon solvent and is free from an organoaluminum compound and a transition metal compound, said magnesium compound being obtained by contacting (i) at least one electron donor selected from the group consisting of alcohols, organocarboxylic acids, aldehydes and amines with (ii) a halogen-containing magnesium compound,
  (B) a transition metal compound in the liquid state, and
  (C) an organoaluminum compound, and

[II] said polymerization or copolymerization is carried out while feeding said compound (C) into a polymerization or copolymerization zone separately from said other compounds (A) and (B), or while adding a part or the whole of said compound (C) to a liquid mixture of said other compounds (A) and (B) and feeding the resulting mixture into said zone, or while feeding a mixture of the compounds (A), (B) and (C) into said zone.

A number of suggestions have been made heretofore in regard to highly active transition metal catalyst components supported on various halogen-containing solid magnesium compounds. These solid transition metal components are fed into a polymerization zone after they have been formed through complicated processes. The performances of the resulting highly active solid transition metal catalyst components may vary unpredictably depending upon various combinations of ingredients for forming the solid transition metal compound, various combinations of means for forming such transition metal compounds, and various combinations of these ingredients and means. It has been the usual practice therefore to subject the transition metal compound to a supporting reaction, and to use it as a highly active solid transition metal catalyst component supported on a carrier. The prior art thus has the disadvantage that the preparation of the solid transition metal catalyst component requires many complicated treating steps, and special care is required in order to feed the solid transition metal catalyst component quantitatively into a polymerization zone and disperse it uniformly in the zone because the solid catalyst component is insoluble in the hydrocarbon solvent used in the polymerization. Even when such a care is taken, the use of the solid transition metal catalyst component insoluble in the hydrocarbon solvent often causes the inconvenience that a polymer or copolymer having a narrow distribution of molecular weight is difficult to obtain, and the monomer composition of the resulting copolymer becomes heterogeneous. Furthermore, since an excessive amount of a transition metal compound is used in supporting it on a carrier, the cost increases, and the occurrence of waste matter causes pollution. For example, British Pat. No. 1,271,411 and U.S. Pat. No. 3,859,231 disclose a supported solid catalyst component produced from a magnesium halide, an alcohol and a transition metal compound, but fails to state that a hydrocarbon-soluble catalyst component can be produced by selecting the type and amount of the electron donor and the treating conditions.

In an attempt to overcome the aforesaid disadvantages, Japanese Patent Publication No. 31968/71 (corresponding to British Pat. No. 1,235,062 and West German Pat. No. 1,924,709) and Japanese Patent Publication No. 39117/75 (corresponding to British Pat. No. 1,358,437 and West German Pat. No. 2,159,910) suggest the use of a magnesium compound soluble in the reaction solvent.

It is difficult however to obtain a high yield comparable to that obtainable by a conventional technique of using the aforesaid solid transition metal catalyst component when utilizing such a magnesium compound soluble in the reaction solvent as disclosed in these patents. The yield obtained by these patents is at most about 10 times that obtained in the absence of the magnesium compound.

Japanese Patent Publication No. 39117/75 cited above shows the use of various magnesium compounds as a solution. For example, it discloses that magnesium diisopropylate is solubilized with an equimolar amount of decanol, or magnesium chloride is used as a solution in an organoaluminum compound. The Patent, however, fails to disclose the solubilization of a halogen-containing magnesium compound such as magnesium chloride with an alcohol. In addition, it is seen from Examples 27 to 30 of the Patent that the yield of polyethylene achieved by using such a magnesium compound is at the highest slightly less than 3 times that achieved in the absence of the magnesium compound.

The present inventors made investigations in order to provide a process for producing an alpha-olefin polymer or copolymer, which overcomes the disadvantage of the low yields in the technique of using magnesium compounds soluble in a reaction solvent, can be carried out with a catalyst activity which is equal to or even higher than that attainable by the use of a solid transition metal catalyst component insoluble in the reaction solvent, and is free from the aforesaid disadvantages attributed to the use of the solid transition metal catalyst component.

These investigations have led to the discovery that such an improved process for producing an alpha-olefin polymer or copolymer can be achieved based on a new technical idea which is quite remote from the conventional technical idea of solubilizing halogen-containing magnesium compounds, with organoaluminum compounds in the above-cited prior patents in which magnesium compound soluble in a reaction solvent are used. Specifically, it has been found that the intended improvement can be achieved by continuously polymerizing or copolymerizing alpha-olefins in the presence of (A) a magnesium compound in the liquid state which is obtained by solubilizing a magnesium compound with a specified electron donor, is soluble in a hydrocarbon solvent, and which is free from an organoaluminum compound and a transition metal compound, (B) a transition metal compound in the liquid state and (C) an organoaluminum compound, while feeding the compound (C) into a polymerization or copolymerization zone separately from the other compounds (A) and (B), or while adding a part or the whole of the compound (C) to a liquid mixture of the compounds (A) and (B) and feeding the resulting mixture into the aforesaid zone, or while feeding a mixture of the components (A), (B) and (C) into said zone.

It has also been found that the above improvement can be achieved especially advantageously when the mole ratio of the electron donor (i)/the halogen-containing magnesium compound (ii) is not less than 1, preferably not less than 2.3, especially preferably not less than 2.8.

It has further been found that according to this improved process, the step of preparing a solid transition metal catalyst component which requires complicated procedures can be omitted, no special care is required in feeding the solid component into a reaction zone, the disadvantage of high cost and pollution attributed to the use of an excessive amount of the transition metal compound can be overcome, a polyolefin or copolyolefin having a relatively narrow distribution of molecular weight can be produced easily, and a copolymer having a narrow distribution of composition and good transparency can be produced.

It is an object of this invention to provide a continuous process for producing an olefin polymer or copolymer which can achieve the aforesaid improvements and advantages.

The above and other objects and advantages of this invention will become more apparent from the following description.

According to the process of this invention, the continuous polymerization or copolymerization of alpha-olefins is carried out while feeding the magnesium compound in the liquid state (A), the transition metal compound in the liquid state (B) and the organoaluminum compound (C) into a polymerization or copolymerization zone. At this time, the compound (C) is fed into the zone separately from the other compounds (A) and (B), or a part or the whole of the compound (C) is first added to a liquid mixture of the compounds (A) and (B) and the resulting mixture is fed into the reaction zone. Or the compounds (A), (B) and (C) are simultaneously mixed and fed into the polymerization zone.

The magnesium compound (A) which is soluble in the polymerization solvent and is free from an organoaluminum compound and a transition metal compound can be obtained by contacting (i) at least one electron donor selected from the group consisting of alcohols preferably having not less than 6 carbon atoms, organocarboxylic acids preferably having not less than 7 carbon atoms, aldehydes preferably having not less than 7 carbon atoms, and amines, preferably alkylamines having not less than 6 carbon atoms, with (ii) a halogen-containing magnesium compound.

Examples of preferred magnesium compounds (ii) are magnesium halides such as magnesium chloride, magnesium bromide, magnesium iodide and magnesium fluoride, the magnesium chloride being preferred. The use of magnesium dihalides, especially magnesium dichloride, is preferred. There can also be used halogen-containing magnesium compounds having organic groups other than hydrocarbon groups, for example $C_2$–$C_{10}$ alkoxy groups such as methoxy, ethoxy, propoxy, butoxy and octoxy groups, $C_6$–$C_{20}$ aryloxy groups such as phenoxy, methylphenoxy, 2,6-dimethylphenoxy and naphthoxy groups, $C_1$–$C_{20}$ acyloxy groups such as formyloxy (HCOO—), acetoxy ($CH_3COO$—), propionyloxy ($C_2H_5COO$—), butyryloxy ($C_3H_7COO$—), valeryloxy ($C_4H_9COO$—), stearoyloxy ($C_{17}H_{33}COO$—) and oleoyloxy ($C_{17}H_{31}COO$—) groups. Halogen-containing magnesium compounds having an alkoxy group are preferred among the magnesium compounds other than magnesium dihalides. These compounds can be prepared by reacting Grignard compounds with alcohols.

There can also be used halogen-containing magnesium compounds produced by halogenating magnesium compounds such as alkoxy magnesiums, aryloxy magnesiums or acyloxy magnesiums or metallic magnesium with halogenating agents such as silicon tetrachloride, hydrogen chloride, chlorine, or halogenated hydrocarbons such as t-butyl chloride, allyl chloride and diphenylmethyl chloride.

Magnesium dihalides are most preferred among the above-exemplified halogen-containing magnesium compounds.

The reaction between the electron donor (i) and the magnesium compound (ii) is carried out preferably at an elevated temperature in a hydrocarbon solvent using the electron donor in an excessive molar amount, although these reaction conditions can changed depending upon the type of the electron donor, the type of the halogen-containing magnesium compound, the type of the polymerization solvent, etc. Conveniently, the mole ratio of the electron donor (i) to the halogen-containing magnesium compound (ii) is not less than 1 in the magnesium compound (A). The above mole ratio is preferably not less than 2.3, however, when a magnesium dihalide is used as the halogen-containing magnesium compound.

For example, when an alcohol is used as the electron donor, the amount of the alcohol is preferably at least 1 mole, more preferably about 2.3 to about 20 moles, especially preferably about 2.8 to about 10 moles, per mole of the halogen-containing magnesium compound. When a magnesium dihalide is used as the halogen-containing magnesium compound, the alcohol is used in an amount of preferably at least 2.3 moles, more preferably about 2.5 moles to about 20 moles, especially preferably about 2.8 moles to 10 moles, per mole of the halogen-containing magnesium compounds.

When an aliphatic hydrocarbon and/or an alicyclic hydrocarbon is used as the hydrocarbon solvent, it is preferred that at least about 0.5 mole, especially at least about 0.7 mole, per mole of the halogen-containing magnesium compound of an alcohol having at least 6 carbon atoms should be used as part of the alcohol used in the above-mentioned preferred amount. At this time, the remainder may consist of an alcohol having 5 or less carbon atoms. When a magnesium dihalide is used as the halogen-containing magnesium compound at this time, it is advisable to use at least about 1.2 moles, preferably at least about 1.5 moles, per mole of the magnesium dihalide, of an alcohol having at least 6 carbon atoms.

In this manner, the total amount of alcohols required to solubilize the halogen-containing magnesium compound can be maintained low and the resulting catalyst ingredient has high activity. If only an alcohol having 5 or less carbon atoms is used, it is preferable to use it in an amount of at least about 15 moles per mole of the halogen-containing magnesium compound.

On the other hand, when an aromatic hydrocarbon is used as the hydrogen solvent, the halogen-containing magnesium compound can be solubilized by using the alcohol in an amount of at least 1 mole per mole of the halogen-containing magnesium compound irrespective of the type of the alcohol.

The reaction between the electron donor (i) and the halogen-containing magnesium compound for the formation of the magnesium compound (A) is carried out preferably in a hydrocarbon solvent. The hydrocarbon solvent may be selected from aliphatic hydrocarbons, alicyclic hydrocarbons, aromatic hydrocarbons and halogen derivatives of these which are the same as those exemplified as the polymerization solvent used in the process of this invention.

The reaction between the electron donor (i) and the halogen-containing magnesium compound (ii) is performed at a temperature of, for example, at least 0° C., preferably at least about 65° C., more preferably about 80° to about 300° C., especially about 100° to about 200° C. The reaction time can be properly selected, and is, for example, at least 1 minute, preferably about 15 minutes to about 5 hours, more preferably about 30 minutes to about 2 hours. Longer reaction periods do not produce any adverse effects.

The electron donor (i) is selected from alcohols, organocarboxylic acids, aldehydes and amines. Preferably, it is selected from alcohols having not less than 6 carbon atoms such as $C_6$–$C_{20}$ alcohols, organocarboxylic acids having not less than 7 carbon atoms such as $C_7$–$C_{20}$ carboxylic acids, aldehydes having not less than 7 carbon atoms such as $C_7$–$C_{18}$ aldehydes, and alkylamines having not less than 6 carbon atoms such as $C_6$–$C_{18}$ alkylamines.

Specific examples of the alcohols as the electron donor (i) include aliphatic alcohols such as 2-ethylbutanol, n-heptanol, n-octanol, 2-ethylhexanol, decanol, dodecanol, tetradecyl alcohol, undecenol, oleyl alcohol and stearyl alcohol; alicyclic alcohols such as cyclohexanol and methylcyclohexanol; aromatic alcohols such as benzyl alcohol, methylbenzyl alcohol, isopropylbenzyl alcohol, α-methylbenzyl alcohol and α,α-dimethylbenzyl alcohol, and aliphatic alcohols containing an alkoxy group such as n-butyl Cellosolve and 1-butoxy-2-propanol. Alcohols having less than 6 carbon atoms such as methanol, ethanol, propanol, butanol, ethylene glycol and methyl carbitol can also be used as the alcohols.

Examples of suitable organocarboxylic acids as the electron donor (i) are caprylic acid, 2-ethylhexanoic acid, undecylenic acid, undecanoic acid, nonylic acid and octanoic acid.

Examples of suitable aldehydes as the electron donor (i) include caprylaldehyde, 2-ethylhexylaldehyde, capraldehyde and undecylic aldehyde.

Examples of suitable amines as the electron donor (i) include heptylamine, octylamine, nonylamine, decylamine, laurylamine, undecylamine and 2-ethylhexylamine.

Titanium compounds or vanadium compounds are preferred as the transition metal compound in the liquid state (B) used in the process of this invention. The titanium compounds are especially preferred. Examples include tetravalent titanium compounds of the formula $Ti(OR)_n X_{4-n}$ in which R is a hydrocarbon group, X is a halogen atom, and $0 \leq n \leq 4$. R represents, for example, a $C_1$–$C_{20}$ saturated or unsaturated alkyl group, which may optionally be substituted with a halogen atom, a lower alkoxy group, etc.

Specific examples of the titanium compounds are $TiCl_4$, $TiBr_4$, $TiI_4$, $Ti(OCH_3)Cl_3$, $Ti(OC_2H_5)Cl_3$, $Ti(OC_6H_5)Cl_3$, $Ti(OC_2H_5)_2Cl_2$, $Ti(OC_3H_7)_2CL_2$, $Ti(OC_2H_5)_3Cl$, $Ti(OC_6H_5)_3Cl$, $Ti(OC_2H_5)_4$, $Ti(OC_3H_7)_4$, $Ti(OC_4H_9)_4$, $Ti(OC_6H_{13})_4$, $Ti(OC_6H_{11})_4$, $Ti(OC_8H_{17})_4$, $Ti[OCH_2(C_2H_5)CHC_4H_9]_4$, $Ti(OC_9H_{19})_4$, $Ti[OC_6H_3(CH_3)_2]_4$, $Ti(OCH_3)_2(OC_4H_9)_2$, $Ti(OC_2H_4Cl)_4$ and $Ti(OC_2H_4OCH_3)_4$.

Other examples of usable titanium compounds are those having a low atomic valency with any crystal system. Specific examples include titanium trihalides such as $TiCl_3.T$ type resulting from the reduction of titanium tetrachloride with titanium metal, $TiCl_3.A$ type resulting from the reduction of titanium tetrachloride with aluminum metal, $TiCl_3.H$ type resulting from the reduction of titanium tetrachloride with hydrogen, and $TiCl_3$ resulting from the reduction of titanium tetrachloride with an organoaluminum compound such as $(C_2H_5)_3Al$, $(C_2H_5)_2AlCl$ and $(C_2H_5)_{1.5}AlCl_{1.5}$; alkoxytitanium (III) compounds such as $Ti(OCH_3)_3$, $Ti(OC_2H_5)_3$, $Ti(O\ n\text{—}C_4H_9)_3$, $Ti(OCH_3)Cl_2$, $2CH_3OH$ and $Ti(OCH_3)_2Cl.CH_3OH$; and $TiCl_2$ obtained by the reduction of $TiCl_3$ with hydrogen.

Normally solid transition metal compounds such as titanium trichloride and titanium dichloride are used after they have been treated to render them liquid. This treatment may be carried out, for example, by contacting the transition metal compound with about 1 to about 24 moles, preferably about 3 to about 15 moles, per mole of the transition metal compound, of the same electron donor as used to prepare hydrocarbon-soluble halogen-containing magnesium compounds. This treatment may sometimes result only in partial dissolving of the transition metal compound. In such a case, it is preferred to separate and use only a solubilized portion of the transition metal compound.

The above treatment can be performed at elevated temperatures of, say, about 65° C. or more, preferably about 80° C. to about 300° C., especially about 100° to about 200° C., for a period of at least about 15 minutes, preferably 20 minutes to 2 hours.

If desired, the solid transition metal compound may be used as a liquid transition metal compound by dissolving it in the liquid magnesium compound (A) obtained as above.

The vanadium compound may, for example, be compounds of the formula $VO(OR)_mX_{3-m}$ in which R and X are as defined hereinabove and $0 \leq m \leq 3$, or $VX_4$ in which X is as defined. Specific examples include $VOCl_3$, $VO(OC_2H_5)Cl_2$, $VO(OC_2H_5)_3$, $VO(OC_2H_5)_{1.5}Cl_{1.5}$, $VO(OC_4H_9)_3$, $VO[OCH_2(CH_2)CH_4H_9]_3$ and $VCl_4$.

Compounds having at least one aluminum-carbon bond in the molecule can be used as the organoaluminum compound (C) in the process of this invention.

Examples of such an organoaluminum compound are those of the following formulae (1) and (2).

$$R^1_lAl(OR^2)_sH_pX_q \qquad (1)$$

wherein $R^1$ and $R^2$ are identical or different and represent a hydrocarbon group containing usually 1 to 15 carbon atoms, preferably 1 to 4 carbon atoms, X represents a halogen atom, l is a number in the range of $0 \leq l < 3$, s is a number in the range of $0 \leq s < 3$, p is a number in the range of $0 \leq p \leq 3$, and q is a number in the range of $0 \leq q < 3$, provided that $m+n+p+q=3$. Examples of the hydrocarbon group for $R^1$ and $R^2$ are alkyl groups having 1 to 15 carbon atoms and alkenyl groups having 3 to 12 carbon atoms.

Complex alkylated products of aluminum and a metal of Group I of the Mendejeff's periodic table having the following formula

$$M^1AlR^1_4 \qquad (2)$$

wherein $M^1$ represents Li, Na or K, and $R^1$ is as defined.

The organoaluminum compounds of formula (1) generally include compounds of the general formula $R^1_lAl(OR^2)_{3-l}$ wherein $R^1$ and $R^2$ are as defined, l is preferably a number in the range of $1.5 \leq l \leq 3$; compounds of the general formula $R^1_lAlX_{3-l}$ wherein $R^1$ and X are as defined and l is preferably a number in the range of $0 < l < 3$; compounds of the general formula $R^1_lAlH_{3-l}$ wherein $R^1$ is as defined and l is preferably a number in the range of $2 \leq l < 3$; and compounds of the general formula $R^1Al(OR^2)_sX_q$ wherein $R^1$ and $R^2$ are as defined, X represents a halogen, $0 < l \leq 3$, $0 \leq s \leq 3$, $0 \leq q < 3$, $l+s+q=3$.

Specific examples of the organoaluminum compounds of formula (1) are trialkyl aluminums such as triethyl aluminum and tributyl aluminum; trialkenyl aluminums such as triisoprenyl aluminum, partially alkoxylated alkyl aluminums, for example, dialkyl aluminum alkoxides such as diethyl aluminum ethoxide and dibutyl aluminum butoxide; alkyl aluminum sesquialkoxides such as ethyl aluminum sesquiethoxide and butyl aluminum sesquibutoxide; compounds having an average composition expressed by $R^1_{2.5}Al(OR^2)_{0.5}$; partially halogenated alkyl aluminum, for example, dialkyl aluminum halide such as diethyl aluminum chloride, dibutyl aluminum chloride and diethyl aluminum bromide; alkyl aluminum sesquihalides such as ethyl aluminum sesquichloride, butyl aluminum sesquichloride and ethyl aluminum sesquibromide; alkyl aluminum dihalides such as ethyl aluminum dichloride, propyl aluminum dichloride and butyl aluminum dibromide; partially hydrogenated alkyl aluminums, for example, dialkyl aluminum hydrides such as diethyl aluminum hydride and dibutyl aluminum hydride, alkyl aluminum dihydrides such as ethyl aluminum dihydride and propyl aluminum dihydride; and partially alcoholated and halogenated alkyl aluminums, for example, alkyl aluminum alkoxyhalides such as ethyl aluminum ethoxychloride, butyl aluminum butoxychloride and ethyl aluminum ethoxybromide.

There can also be used organoaluminum compounds in which two or more aluminum atoms are bonded through an oxygen or nitrogen atom, as aluminum compounds similar to those of formula (1). Specific examples are $(C_2H_5)_2$-AlOAl$(C_2H_5)_2$, $(C_4H_9)_2$AlOAl$(C_4H_9)_2$ and

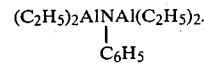

$$\begin{array}{c}(C_2H_5)_2AlNAl(C_2H_5)_2.\\|\\C_6H_5\end{array}$$

The above exemplified compounds may be used as mixtures.

Examples of the compounds of formula (2) are $LiAl(C_2H_5)_4$ and $LiAl(C_7H_{15})_4$.

Trialkyl aluminum compounds and alkyl aluminum halides and their mixtures are preferred among the above exemplified organoaluminum compounds (C).

According to the process of this invention, an alpha-olefin, or a mixture of alpha-olefins, or a mixture of an alpha-olefin with up to 5 mole% of a diolefin is polymerized or copolymerized continuously in a hydrocarbon solvent using the liquid magnesium compound (A), the liquid transition metal compound (B) and the organoaluminum compound (C). The polymerization is performed such that the compound (C) is fed into a polymerization or copolymerization zone separately from the other compounds (A) and (B), or that a part or the whole of the compound (C) is added to a liquid mixture of the other compounds (A) and (B) and the mixture is fed into the above polymerization or copolymerization zone, or that a mixture of the compounds (A), (B) and (C) are fed to the reaction zone.

Examples of the alpha-olefin are $C_2$–$C_{20}$, preferably $C_2$–$C_{12}$, alpha-olefins such as ethylene, propylene, 1-butene, 4-methyl-1-pentene and 1-octene.

The copolymerization may be random copolymerization or block copolymerization. In the copolymerization, a diolefin such as a conjugated or non-conjugated diene can be used in an amount of up to 5 mole% as a comonomer. Examples of the diolefin are butadiene, isoprene, 1,4-hexadiene, dicyclopentadiene, 5-ethylidene-2-norbornene and 1,7-octadiene. The diolefin can be copolymerized in an amount of 0.1 to 5 mole%, preferably about 0.2 to about 3 mole%. In this case, a copolymer having an iodine value of about 5 to about 30 and being vulcanizable with sulfur is obtained. A vulcanizate of the copolymer has superior properties and can be used as a vulcanized rubber having a high strength.

The polymer or copolymer obtained by the process of this invention may be in the form of plastics or rubber.

The continuous polymerization or copolymerization in accordance with this invention is carried out in a hydrocarbon solvent. Examples of the solvent include aliphatic hydrocarbons such as pentene, hexane, heptane, octane, decane, dodecane and kerosene, and the halogen derivatives thereof; alicyclic hydrocarbons such as cyclohexane, methylcyclopentane and methylcyclohexane, and the halogen derivatives thereof; and aromatic hydrocarbons such as benzene, toluene and xylene and the halogen derivatives thereof such as chlorobenzene. The olefins used in the polymerization may also be used as a solvent.

Preferably, the continuous polymerization or copolymerization is carried out under such conditions that in the polymerization or copolymerization zone, the concentration of the transition metal compound in the hydrocarbon a solvent is in the range of 0.0005 to about 1 millimole/liter, especially about 0.001 to about 0.5 millimole/liter, calculated as transition metal, the mole ratio of the transition metal compound to the halogen-containing magnesium compound is from 0.005 to about 0.5, preferably from about 0.01 to about 0.33, more preferably from about 0.03 to about 0.25, and the mole ratio of the organoaluminum compound to the transition metal compound is in the range of from about 5 to about 2,000, preferably from about 20 to about 500. The organoaluminum should be used in an amount sufficient for it not to be deactivated by the electron donor, etc.

The concentration of the halogen-containing magnesium compound is preferably from about 0.001 to about 200 millimoles, more preferably from about 0.003 to about 50 millimoles, calculated as magnesium atom, per liter of the liquid phase.

In the process of this invention, a continuous polymerization method is employed in which an alpha-olefin or a mixture of alpha-olefins or a mixture of an alpha-olefin and a diolefin is fed continuously into the polymerization zone, and the hydrocarbon containing the resulting polymer or copolymer is continuously discharged from the zone. Usually, the individual catalyst ingredients (A), (B) and (C) are preferably fed continuously. They may be fed at short intervals. At this time, the ingredients (A), (B) and (C) are fed separately into the polymerization or copolymerization zone. Or a liquid mixture (hydrocarbon solution) of the ingredients (A) and (B) is first prepared, and the mixture and the ingredient (C) may be separately fed into the polymerization or copolymerization zone. Or a part or the whole of the ingredient (C) is added to the aforesaid liquid mixture of the ingredients (A) and (B), and the resulting mixture and the remainder may be fed separately into the polymerization or copolymerization zone. It is also possible to mix the compound (A), the compound (B) and a part or the whole of the compound (C), and feed the mixture to the polymerization zone. The method involving mixing the compounds (A) and (B) in advance is preferred, however.

According to this method, a solid seems to precipitate in the polymerization or copolymerization zone. Since, however, the precipitate is very fine, its dispersibility in the polymerization or copolymerization zone is very good.

The ingredient composed of a magnesium halide and an electron donor such as an alcohol is fed into the polymerization zone preferably after it is dissolved in a hydrocarbon solvent by the method described hereinabove. When the above dissolved ingredient becomes temporarily solid by cooling or otherwise, it can be re-dissolved by heating or otherwise before use. If, however, the temperature of the polymerization system is above the dissolving temperature, such heating is not particularly necessary.

The polymerization or copolymerization temperature may be properly changed. For example, it is about 20° to about 350° C., preferably about 65° to about 300° C. When a copolyolefin having good transparency is desired, it is preferred to use liquid-phase polymerization in an inert hydrocarbon medium and to select a temperature at which the resulting copolyolefin dissolves. For example, in the production of a resinous copolymer from ethylene and a minor proportion of another alpha-olefin, the polymerization temperature is preferably from the melting point of the copolymer to about 200° C. The polymerization pressure is preferably from atmospheric pressure to about 100 kg/cm$^2$-G, especially from about 2 to about 60 kg/cm$^2$-G.

In the performance of the process of this invention, hydrogen, an organometallic compound of a metal of Group II of the periodic table, and/or various electron donors such as alcohols, ethers, esters, amines, ketones, carboxylic acids, amides, phosphorus compounds, sulfur compounds and acid halides may be present in the polymerization zone in order to control molecular weights and stereoregularity.

According to this invention, polymers having a narrow distribution of molecular weights can be obtained. When the process of this invention is applied to the copolymerization of two or more olefins, a copolymer having a narrow distribution of composition and good transparency can be obtained.

The process of this invention, however, is not limited to these specific embodiments. For example, it can be used to obtain polymers having a wide distribution of molecular weights by using a molecular weight control agent or by using a combination of two or more different sets of polymerization conditions in order, for example, to improve the processability of polyolefins.

The following examples illustrate the present invention more specifically.

EXAMPLE 1

Commercially available anhydrous magnesium chloride (50 g) was suspended in 1 liter of purified kerosene in an atmosphere of nitrogen, and 205 g (3 moles per mole of the magnesium chloride) of 2-ethylhexyl alcohol was added. With stirring, the mixture was gradually heated, and reacted at 130° C. for 1 hour. The solid disappeared completely, and a colorless clear solution was obtained. Cooling of this solution to room temperature did not yield a solid precipitate, and it remained a colorless clear solution. Thus, a magnesium chloride/2-ethylhexyl alcohol complex as a solution in kerosene was obtained. To the solution was added 65.6 millimoles of Ti(O n-C$_4$H$_9$)$_4$, and the mixture was stirred well. No change was noted in appearance, and the mixture became a uniform clear solution. Thus, a solution of a mixture of the magnesium chloride/2-ethylhexyl alcohol complex and Ti(O n-C$_4$H$_9$)$_4$ was obtained. The magnesium/titanium mole ratio in the solution was 8.

A 200-liter continuous polymerization reactor was continuously charged with 100 liters/hr of dehydrate and purified hexane, 36 millimoles/hr of diethyl aluminum monochloride, and 0.45 millimole/hr, calculated as titanium atom, of the solution of a mixture of the magnesium chloride/2-ethylhexyl alcohol complex and Ti(O n-C$_4$H$_9$)$_4$. Simultaneously, 12.0 kg/hr of ethylene, 12.0 liters/hr of 4-methyl-1-pentene and 60 liters/hr of hydrogen were fed continuously into the reactor, and these monomers were continuously polymerized at 140° C. under a total pressure of 24 kg/cm$^2$ with an average residence time of about 1 hour. The concentration of the copolymer in the hexane solvent was 80 g/liter, and the polymerization activity of the catalyst was 17,800 g of copolymer/millimole of Ti. The resulting copolymer had a density of 0.924 g/cm$^3$ and a melt index of 2.66 and contained 14.4 isobutyl groups per 1000 carbon atoms.

A film having a thickness of 54 microns was produced from the copolymer by a commercially available tubular film forming machine for high-pressure polyethylene (a product of Modern Machinery Co.). The film had a haze of 9.4%. The molding conditions were as follows:
Resin temperature: 170° C.
Screw rotating speed: 60 revolutions per minute
Die diameter: 100 mm
Die slit width: 1.0 mm

COMPARATIVE EXAMPLE 1

Commercially available anhydrous magnesium chloride (50 g) ws suspended in 2 liters of hexane, and with stirring, 3 moles of ethyl alcohol was added dropwise at room temperature over the course of about 1 hour. After the addition, the mixture was stirred for 30 minutes, and the hexane was removed under vacuum. The residue was dried, and 700 ml of $TiCl_4$ was added. The mixture was reacted at 120° C. for 1 hour. The reaction mixture was filtered to afford a titanium-containing solid catalyst. The catalyst contained 6.8% by weight of titanium and 61.2% by weight of chlorine as atoms.

Ethylene and 4-methyl-1-pentene were copolymerized in the same way as in Example 1 except that the solution of a mixture of the magnesium chloride/2-ethylhexyl alcohol complex and $Ti(O\ n\text{-}C_4H_9)_4$ was not used, but 0.45 millimole/hr, calculated as titanium atom, of the titanium-containing solid catalyst obtained as above was fed continuously. The concentration of the copolymer in the hexane solvent was 53 g/liter, and the polymerization activity of the catalyst was 10,600 g of copolymer/millimole of Ti. The resulting copolymer had a density of 0.922 g/cm$^3$ and a melt index of 4.1 and contained 14.4 isobutyl groups per 1000 carbon atoms.

A film having a thickness of 54 microns which was produced from the copolymer by the same molding machine and under the same molding conditions as in Example 1 had a haze of 40.5%.

COMPARATIVE EXAMPLE 2

The procedure of Example 1 was repeated except that the solution of a mixture of the magnesium chloride/2-ethylhexyl alcohol complex and $Ti(O\ n\text{-}C_4H_9)_4$ was not used, but a hexane solution of $Ti(O\ n\text{-}C_4H_9)_4$ was used. Polymerization scarcely proceeded, and no evaluation of properties could be made.

EXAMPLE 2

The same continuous polymerization reactor as used in Example 1 was charged continuously and separately with 100 liters/hr of hexane as a solvent, 30 millimoles/hr of diethyl aluminum monochloride, 2.4 millimoles/hr, calculated as magnesium atom, of a solution of a magnesium chloride/2-ethylhexyl alcohol complex, and 0.3 millimole/hr, calculated as titanium atom, of a hexane solution of $Ti(O\ n\text{-}C_4H_9)_4$. Ethylene was continuously fed into the polymerization reactor so that the pressure in the reactor reached 30 kg/cm$^2$, and was polymerized at 140° C. with an average residence time of about 1 hour. The molecular weight of the resulting polyethylene was adjusted by continuously feeding hydrogen.

The concentration of the polymer in the solvent was 95 g/liter, and the polymerization activity of the catalyst was 31,700 g of polyethylene/millimole of Ti. The polymer had a density of 0.966 g/cm$^3$ and a melt index of 7.0.

EXAMPLE 3

Commercially available anhydrous magnesium chloride (50 g) was suspended in 1 liter of purified kerosene in an atmosphere of nitrogen, and 205 g (3 moles per mole of the magnesium chloride) of 2-ethylhexyl alcohol was added. With stirring, the mixture was gradually heated, and reacted at 130° C. for 1 hour. The solid completely disappeared, and a colorless clear solution was obtained. Cooling of the solution to room temperature did not yield solid precipitate, and the solution remained a colorless transparent solution.

To the solution were added 13.0 g of commercially available titanium chloride (trademark TAC-131, a product of Toho Titanium Co., Ltd.) and 51.1 g of 2-ethylhexyl alcohol. Heating the mixture to 110° C. afforded a green uniform solution. (Commercially available magnesium chloride and titanium trichloride respectively contain metallic magnesium and metallic aluminum as impurities, and these metals may precipitate. The precipitation, however, does not affect subsequent polymerization.)

In the above manner, a solution of a mixture of a magnesium chloride/2-ethylhexyl alcohol complex and titanium trichloride was obtained. The solution was a clear solution at room temperature. The magnesium/titanium mole ratio in the solution was 8.

Ethylene was continuously polymerized in the same way as in Example 2 except that as catalyst ingredients, 15 millimoles/hr of triethyl aluminum, 15 millimoles/hr of diethyl aluminum monochloride, and 0.5 millimole/hr, calculated as titanium atom, of the solution of a mixture of magnesium chloride/2-ethylhexyl alcohol complex and titanium trichloride obtained as described above were continuously fed into the polymerization reactor.

The concentration of the polymer in the solvent was 110 g/liter, and the polymerization activity of the catalyst was 22,000 g of polyethylene/millimole of Ti. The polymer had a density of 0.968 g/cm$^3$ and a melt index of 2.3.

COMPARATIVE EXAMPLE 3

Ten grams of commercially available titanium trichloride (TAC-131) was suspended in 1 liter of kerosene, and 40 g (6 moles per mole of the titanium trichloride) of 2-ethylhexyl alcohol was added. The mixture was heated to 100° C. to give a green uniform solution.

Ethylene was reacted in the same way as in Example 3 except that the solution of a mixture of magnesium chloride/2-ethylhexyl alcohol complex and titanium trichloride was not used, but 0.5 millimole/hr, calculated as titanium atom, of the resulting titanium trichloride-alcohol solution was continuously fed. Polyethylene could not be obtained at all.

COMPARATIVE EXAMPLE 4

Commercially available $MgCl_2$ (30 g) was suspended in 1 liter of purified kerosene, and 43.5 g (3 moles per mole of $MgCl_2$) of ethanol was added dropwise at room temperature. A part of the resulting mixture was separated, and an attempt was made to dissolve it in kerosene at an elevated temperature. During the temperature elevation, however, it became sticky, and did not dissolve in kerosene. Thus, the slurry-like mixture obtained as above by addition of ethanol was used in the following experiment.

Ethylene was continuously polymerized in the same way as in Example 3 except that 5 millimoles/hr, calculated as magnesium atom, of the $MgCl_2 \cdot 3C_2H_5OH$ slurry obtained as above, and 0.5 millimole/hr, calculated as titanium atom, of the kerosene solution of titanium trichloride/2-ethylhexyl alcohol complex obtained in Comparative Example 3 were continuously fed as catalyst ingredients.

The concentration of the polymer in the solvent was less than 5 g/liter, and the activity of the catalyst was very low.

EXAMPLE 4

The same 200-liter continuous polymerization reactor as used in Example 1 was charged continuously with 100 liters/hr of dehydrated and purified hexane, 40 millimoles/hr of diethyl aluminum monochloride, 10.8 millimoles/hr of isoamyl ether and 0.5 millimole/hr, calculated as titanium atom, of the solution of a mixture of a magnesium chloride/2-ethylhexyl alcohol complex and titanium trichloride obtained in Example 3. Simultaneously, 12 kg/hr of ethylene, 12.4–13 liters/hr of 1-butene and 30–50 liters/hr of hydrogen were continuously fed into the polymerization reactor, and the monomers were continuously polymerized at a polymerization temperature of 130° C. under a total pressure of 24 to 27 kg/cm² with an average residence time of about 1 hour. A copolymer of ethylene and 1-butene was obtained in an amount of 9 kg/hr. The polymerization activity of the catalyst was 18,000 g of copolymer/millimole of Ti.

The resulting copolymer had a density of 0.890 g/cm³, a melt index of 3.92 and an ethylene content of 91.5 mole%. The content of a boiling methyl acetate-soluble portion in the copolymer was 0.6%, and the copolymer was scarcely sticky.

A sheet having a thickness of 1 mm produced from the copolymer in a customary manner had a haze of 18%.

COMPARATIVE EXAMPLE 5

Commercially available anhydrous magnesium chloride (20 g) and 4 g of $TiCl_3$ (TAC-131) were charged under a nitrogen atmosphere into a stainless steel (SUS-32) ball mill cylinder having an inner capacity of 800 ml and an inside diameter of 100 mm and containing 100 stainless steel (SUS-32) balls each having a diametet of 15 mm, and pulverized at 125 rpm for 120 hours. The pulverized product was withdrawn from the mill within a nitrogen-filled box. The amount of titanium supported was 40 mg/g of solid. Thus, a solid titanium catalyst was obtained.

Ethylene and 1-butene were continuously polymerized in the same way as in Example 4 except that the resulting solid titanium catalyst was used instead of the solution of a mixture of a magnesium chloride/2-ethylhexyl alcohol complex and titanium trichloride. A copolymer of ethylene and 1-butene was obtained in an amount of 2.8 kg/hr, and the polymerization activity of the catalyst was 5,600 g of copolymer/millimole of Ti.

The resulting copolymer had a density of 0.892 g/cm³, a melt index of 2.17 and an ethylene content of 84.1 mole%. The content of a boiling methyl acetate-soluble portion in this copolymer was 1.5%, and the copolymer was very sticky.

A sheet having a thickness of 1 mm obtained from the copolymer in a customary manner had a haze of 58%.

EXAMPLE 5

A 3-liter reactor equipped with a reflux condenser was charged with 58.3 g (2.4 moles) of metallic magnesium and 1 liter of hexane. Then, 2.4 moles of ethyl silicate (a product of Kanto Chemical Co., Ltd.) and 6 ml of a kerosene solution of iodine (prepared by dissolving iodine in kerosene to saturation) were added. The mixture was heated to 70° C., and 2.64 moles of n-$C_4H_9Cl$ was added dropwise over the course of 1 hour. After the addition, the mixture was reacted at 70° C. for 4 hours, and then filtered to afford a solid reaction product, $Mg(OC_2H_5)Cl$.

Fifty grams of the resulting $Mg(OC_2H_5)Cl$ was suspended in 1.5 liters of kerosene, and 186.5 g [3 moles per mole of $Mg(OC_2H_5)Cl$] of 2-ethylhexyl alcohol was added. With stirring, the mixture was heated to 130° C., and reacted for 1 hour. The solid $Mg(OC_2H_5)Cl$ completely disappeared to afford a clear solution. The solution remained a clear solution at room temperature.

$TiCl_3$ (TAC-131) was added to the resulting solution of $Mg(OC_2H_5)Cl$/2-ethylhexyl complex in such an amount that the Mg/Ti mole ratio reached 10. When the mixture was heated to 100° C., the solid $TiCl_3$ disappeared to afford a clear yellowish brown solution of a mixture of the $Mg(OC_2H_5)Cl$/2-ethylhexyl alcohol complex and $TiCl_3$. The solution remained a clear solution at room temperature.

Ethylene was continuously polymerized in the same way as in Example 2 except that as catalyst ingredients, 40 millimoles/hr of diethyl aluminum monochloride and 0.5 millimole/hr, calculated as titanium atom, of the solution of a mixture of $Mg(OC_2H_5)Cl$/2-ethylhexyl alcohol complex and $TiCl_3$ obtained above were continuously fed.

Polyethylene was obtained in an amount of 6.8 kg/hr, and the polymerization activity of the catalyst was 13,600 g of polyethylene/millimole of Ti. The polymer had a density of 0.961 g/cm³ and a melt index of 0.50.

EXAMPLE 6

An atmospheric-pressure continuous polymerization vessel (overflow type) having an available capacity of 2 liters was charged continuously with 0.4 liter/hr of dehydrated and purified kerosene as a solvent, 0.7 millimole/hr of triisobutyl aluminum, 2.3 millimoles/hr of diethyl aluminum monochloride, 1.28 millimoles/hr of 2-ethylhexyl alcohol and 0.03 millimole/hr, calculated as titanium atom, of the solution of a mixture of a magnesium chloride/2-ethylhexyl alcohol complex and Ti(O n-$C_4H_9)_4$ obtained in Example 1 (the catalyst ingredients were fed in amounts calculated as kerosene and prescribed so that the amount of the kerosene solvent fed was 0.6 liter/hr). Simultaneously, a gaseous mixture of ethylene and propylene (having an ethylene/propylene mole ratio of 40/60) was passed through the polymerization reactor at a rate of 200 liters/hr, and copolymerized at a temperature of 90° C. During the continuous polymerization, the polymer solution was a uniform clear solution with no gel formation.

The resulting copolymer was precipitated from a large amount of methanol to afford an ethylene/propylene copolymer at a rate of 32 g/hr. The polymerization activity of the catalyst was 1,070 g of copolymer/millimole of Ti. The copolymer had a melt index of 1.92 and an ethylene content of 75.1 mole%. The content of a boiling methyl acetate-soluble portion in the copolymer was 0.7%, and the copolymer was scarcely sticky.

A sheet having a thickness of 1 mm produced from the copolymer in a customary manner had a haze of 12%.

COMPARATIVE EXAMPLE 6

Ethylene and propylene were continuously copolymerized in the same way as in Example 6 except that the titanium-containing solid catalyst obtained in Comparative Example 1 was used instead of the solution of a mixture of a magnesium/2-ethylhexyl alcohol complex and Ti(O n-C$_4$H$_9$)$_4$. The polymerization mixture was slurry-like with floating particles (presumed to be crystals), and was turbid with a white appearance.

A copolymer of ethylene and propylene was obtained in an amount of 29 g/hr, and the polymerization activity of the catalyst was 970 g of copolymer/millimole of Ti. The copolymer had a melt index of 6.84, and an ethylene content of 68 mole%. The content of a boiling methyl acetate-soluble portion of the copolymer was 2.0%, and the copolymer was very sticky.

A sheet having a thickness of 1 mm produced from the copolymer in a customary manner had a haze of 58%.

EXAMPLE 7

Ten grams of TiCl$_4$ was suspended in 100 ml of purified kerosene, and with stirring, 4.5 ml of Al(C$_2$H$_5$)$_{1.5}$Cl$_{1.5}$ was added dropwise at 0° C. over the course of 30 minutes. The mixture was heated to 80° C. over the course of 30 minutes, and reacted for 1 hour. The reaction mixture was cooled to room temperature, and the supernatant liquid was washed by decantation to obtain solid titanium trichloride.

The resulting titanium trichloride was added to a kerosene solution of magnesium chloride/2-ethylhexyl alcohol complex obtained in the same way as in Example 1 in such an amount that the Mg/Ti mole ratio reached 10. When the mixture was heated to 100° C., a greenish blue clear solution was obtained. The solution remained a clear solution at room temperature. Thus, a solution of a mixture of the magnesium chloride/2-ethylhexyl alcohol complex and titanium trichloride was obtained.

Ethylene and propylene were copolymerized in the same way as in Example 6 except that the resulting titanium-containing mixed solution was used instead of the solution of a mixture of a magnesium chloride/2-ethylhexyl alcohol complex and Ti(O n-C$_4$H$_9$)$_4$. A copolymer of ethylene and propylene was obtained in an amount of 27 g/hr, and the polymerization activity of the catalyst was 900 g of copolymer/millimole of Ti. The copolymer had a melt index of 2.27 and an ethylene content of 81.2 mole%. The content of a boiling methyl acetate-soluble portion of the copolymer was 0.6%, and the copolymer was scarcely sticky.

A sheet having a thickness of 1 mm prepared from the copolymer in a customary manner had a haze of 15%.

EXAMPLES 8 TO 13

Example 2 was repeated except that the type of the titanium compound, the magnesium/titanium mole ratio and the type of the organoaluminum compound were changed as shown in Table 1. The results are also shown in Table 1.

TABLE 1

| | Polymerization conditions | | | | Polymerization results | | |
|---|---|---|---|---|---|---|---|
| | | Mg/Ti mole ratio | Organoaluminum compound | | | | |
| Example | Titanium compound | | Type | Amount (mmoles/hr) | Polymerization activity (g-PE/mmole-Ti) | Melt index | Density (g/cm$^3$) |
| 8 | TiCl$_4$ | 8 | Al(C$_2$H$_5$)$_2$Cl | 30 | 32,400 | 4.9 | 0.966 |
| 9 | TiCl$_4$ | 8 | Al(iso-C$_4$H$_9$)$_3$ / Al(C$_2$H$_5$)$_2$Cl | 15 / 15 | 35,700 | 7.7 | 0.968 |
| 10 | TiCl$_4$ | 12 | Al(C$_2$H$_5$)$_2$Cl | 30 | 39,400 | 7.3 | 0.966 |
| 11 | Ti(O—EHA)$_4$ (*) | 8 | Al(C$_2$H$_5$)$_2$Cl | 30 | 35,700 | 4.7 | 0.963 |
| 12 | Ti(O n-C$_3$H$_7$)$_4$ | 8 | Al(C$_2$H$_5$)$_2$Cl | 30 | 36,000 | 4.3 | 0.965 |
| 13 | Ti(O iso-C$_3$H$_7$)$_4$ | 8 | Al(C$_2$H$_5$)$_2$Cl | 30 | 29,700 | 18 | 0.964 |

(*) Titanium (IV) 2-ethylhexoxide

EXAMPLE 14

Commercially available MgCl$_2$ (30 g) was suspended in 1 liter of kerosene, and 192.6 g (6 moles per mole of the magnesium chloride) of 2-ethylbutyl alcohol was added. With stirring, the mixture was heated. At 140° C., MgCl$_2$ dissolved to form a colorless clear solution. When the solution was allowed to cool, it became whitely turbid at less than about 60° C. to form a solid precipitate. But at about 60° C. or more, it was a clear solution. Commercially available titanium trichloride (TAC-131) was added to the solution so that the Mg/Ti mole ratio reached 10. When the mixture was heated to 100° C., a bluish green clear solution was obtained. When the solution was cooled to room temperature, it separated into a solid precipitate and a bluish green clear solution. At more than about 60° C., the solid disappeared, and a bluish green clear solution resulted.

Ethylene was polymerized in the same way as in Example 3 except that as catalyst ingredients, 30 millimoles/hr of triethyl aluminum, 30 millimoles/hr of diethyl aluminum monochloride and 0.5 millimole/hr, calculated as titanium atom, of the resulting titanium-containing solution obtained as above. A catalyst-preparing drum, pipelines and pumps for feeding the above titanium ingredients were kept at 100° C. to prevent precipitation of solids.

The concentration of the resulting polymer in the solvent was 98 g/liter, and the polymerization activity was 19,600 g of polyethylene/millimole of Ti. The polymer had a melt index of 4.8.

EXAMPLE 15

A titanium-containing solution was prepared by adding TiCl$_4$ to a magnesium chloride/2-ethylbutyl alcohol complex in the same way as in Example 14, in such an amount that the Mg/Ti mole ratio reached 12. Using the titanium-containing mixed solution, ethylene was continuously polymerized in the same way as in Example 14. The concentration of the resulting polymer was 77 g/liter, and the polymerization activity of the catalyst was 15,400 g of polyethylene/millimole of Ti. The polymer had a melt index of 2.6.

EXAMPLE 16

Commercially available anhydrous magnesium chloride (50 g) was suspended in 1.5 liters of kerosene under a nitrogen atmosphere, and 136.5 g (2 moles per mole of the magnesium chloride) of 2-ethylhexyl alcohol was added. With stirring, the mixture was heated, and reacted at 130° C. for 1 hour. The solid portion remained. The mixture was cooled to room temperature to precipitate the solid portion. The supernatant liquid was taken out. Analysis of the supernatant liquid showed that magnesium chloride dissolved.

Ethylene was continuously polymerized in the same way as in Example 2 except that the resulting dissolved magnesium chloride and a titanium trichloride/alcohol solution obtained in the same way as in Comparative Example 3 were used.

The concentration of the resulting polymer in the solvent was 67 g/liter, and the polymerization activity of the catalyst was 22,000 g of polyethylene/millimole of Ti. The polymer had a melt index of 3.9.

EXAMPLE 17

Commercially available anhydrous magnesium chloride (50 g) was suspended in 2 liters of purified kerosene under a nitrogen atmosphere, and 136.3 g (2 moles per mole of the magnesium chloride) of 2-ethylhexyl alcohol and 24 g (equimolar to the magnesium chloride) of ethanol were added. With stirring, the mixture was gradually heated, and reacted at 120° C. for 1 hour. The solid disappeared completely to give a colorless clear solution. When the solution was cooled, it became whitely turbid at less than about 40° C. to precipitate the solid. But at about 40° C. or more, the solution remained a clear solution.

$Ti(O\ n-C_4H_9)_4$ was added to the resulting magnesium/2-ethylhexyl alcohol/ethanol complex in such an amount that the Mg/Ti mole ratio reached 10.

Ethylene was polymerized in the same way as in Example 14 except that the resulting titanium-containing mixed solution was used.

The concentration of the resulting polymer in the solvent was 90 g/liter, and the polymerization activity of the catalyst was 18,000 g of polyethylene/millimole of Ti. The polymer had a melt index of 5.8.

EXAMPLE 18

Commercially available $MgCl_2$ (50 g) was suspended in 2.5 liters of kerosene, and 586.5 g (6 moles per mole of $MgCl_2$) of lauryl alcohol was added. With stirring, the mixture was heated. At about 140° C., it became a clear solution. When the solution was allowed to cool, a solid was precipitated at about 40° C. But at more than about 40° C., it remained a clear solution.

Commercially available $TiCl_3$ (TAC-131) was added to the resulting $MgCl_2$-lauryl alcohol complex solution in such an amount that the Mg/Ti mole ratio reached 10. When it was heated to 100° C., a bluish green transparent solution resulted. When the solution was allowed to cool, a solid was precipitated at less than about 40° C., and the solution separated into a bluish green solution and a white precipitate. At about 40° C. or more, it remained as a clear solution.

Ethylene was continuously polymerized in the same way as in Example 14 except that the resulting titanium-containing mixed solution was used.

The concentration of the polymer in the solvent was 85 g/liter, and the polymerization activity of the catalyst was 17,000 g of polyethylene/millimole of Ti. The polymer had a melt index of 6.3.

EXAMPLE 19

Commercially available $MgCl_2$ (50 g) was suspended in 500 ml of kerosene, and 292.5 g (3 moles per mole of $MgCl_2$) of laurylamine was added. With stirring, the mixture was gradually heated. At more than 110° C., it became a clear solution. When the solution was allowed to cool, a solid precipitate formed at about 75° C. When this solution was re-heated to more than 75° C., it became a clear solution. In this manner, an $MgCl_2$-laurylamine complex solution was obtained.

Commercially available titanium trichloride (TAC-131) was added to the resulting $MgCl_2$-laurylamine complex solution in such an amount that the Mg/Ti mole ratio reached 10. Furthermore, 6 moles, per mole of $TiCl_3$, of laurylamine was added. When the mixture was heated to 100° C., a bluish green uniform clear solution was obtained.

Ethylene was continuously polymerized in the same way as in Example 14 except that the resulting titanium-containing solution was used.

The concentration of the resulting polymer in the solvent was 58 g/liter, and the polymerization activity of the catalyst was 11,600 g of polyethylene/millimole of Ti. The copolymer had a melt index of 1.3.

EXAMPLE 20

Commercially available $MgCl_2$ (50 g) was suspended in 500 ml of kerosene, and 387 g (4 moles per mole of $MgCl_2$) of undecylenic acid was added. When the mixture was gradually heated, a clear solution was formed at more than 95° C. It remained a clear solution at room temperature.

Ethylene was continuously polymerized in the same way as in Example 2 except that as catalyst ingredients, 40 millimoles/hr of diethyl aluminum monochloride, 5 millimoles/hr of the resulting magnesium solution, and 0.5 millimole/hr of $Ti(O\ n-C_4H_9)_4$ were continuously fed.

The concentration of the resulting polymer in the solvent was 48 g/liter, and the polymerization activity of the catalyst was 9,600 g of polyethylene/millimole of Ti. The polymer had a melt index of 0.85.

EXAMPLE 21

Commercially available anhydrous magnesium chloride (50 g) was suspended in 500 ml of kerosene under a nitrogen atmosphere, and 134.4 g (6 moles per mole of the magnesium chloride) of 2-ethylhexylaldehyde was added. With stirring, the mixture was heated, and reacted at 130° C. for 1.5 hours. The reaction mixture was an almost colorless clear solution. When it was allowed to stand at room temperature, a small amount of a white solid precipitated.

Ethylene was polymerized in the same way as in Example 2 except that as catalyst ingredients, 24 millimoles/hr of diethyl aluminum monochloride, 0.4 millimole/hr of $Ti(O\ n-C_4H_9)_4$, and 2.4 millimoles/hr, calculated as magnesium atom, of the supernatant liquid of the reaction product obtained as above were continuously and separately fed into the reactor.

The concentration of the resulting polymer in the solvent was 59 g/liter, and the polymerization activity of the catalyst was 14,800 g of polyethylene/millimole of Ti. The polymer had a melt index of 1.0.

EXAMPLE 22

Commercially available anhydrous magnesium chloride (40 g) was suspended in 1 liter of purified kerosene under a nitrogen atmosphere, and 150 g (3 moles per mole of the magnesium chloride) of n-butyl Cellosolve was added. With stirring, the mixture was gradually heated to 90° C. When the temperature reached 90° C., 150 g of n-butyl Celloslve was further added, and the reaction was performed at 90° C. for 1 hour. A pale yellow clear solution was formed. It remained a clear solution at room temperature.

Ethylene was continuously polymerized in the same way as in Example 2 except that as catalyst ingredients, 100 millimoles/hr of diethyl aluminum monochloride, 0.5 millimole/hr of Ti(O n-$C_4H_9$)$_4$, and 5 millimoles/hr, calculated as magnesium atom, of the resulting magnesium solution were continuously fed into the polymerization reactor.

The concentration of the resulting polymer in the solvent was 42 g/liter, and the polymerization activity of the catalyst was 8,400 g of polyethylene/millimole of Ti. The polymer had a melt index of 1.8.

EXAMPLE 23

Commercially available anhydrous magnesium chloride (21 g) was suspended in 500 ml of toluene under a nitrogen atmosphere, and 40 g (3 moles per mole of the magnesium chloride) of n-propyl alcohol was added. With stirring, the mixture was gradually heated, and reacted at 80° C. for 1 hour. A colorless clear solution was formed. It remained a colorless clear solution at room temperature.

Ti(O n-$C_4H_9$)$_4$ was added to the resulting $MgCl_2$/n-propyl alcohol solution in such an amount that the Mg/Ti mole ratio reached 8.

Ethylene and propylene were copolymerized in the same way as in Example 6 except that toluene was used as a polymerization solvent and as a diluent for the catal catalyst ingredients, and the titanium-containing solution obtained as above was used. The polymerization solution was a clear solution without gel precipitation.

A copolymer of ethylene and propylene was obtained in an amount of 25 g/hr. The polymerization activity of the catalyst was 830 g of copolymer/millimole of Ti. The copolymer had a melt index of 1.86 and an ethylene content of 78 mole%. The content of a boiling methyl acetate-soluble portion in the copolymer was 0.7%, and the copolymer was scarcely sticky.

A sheet having a thickness of 1 mm produced from the copolymer in a customary manner had a haze of 20%.

EXAMPLE 24

Ethylene was polymerized in the same way as in Example 2 except that 0.24 millimole/hr, calculated as titanium atom, of a hexane solution of Ti(O n-$C_4H_9$)$_2Cl_2$ was used instead of Ti(O n-$C_4H_9$)$_4$. The polymerization activity of the catalyst was 38,000 g of polyethylene/millimole of Ti, and the resulting polyethylene had a melt index of 6.9 and a density of 0.966 g/cm$^3$.

EXAMPLE 25

Commercially available anhydrous magnesium chloride (50 g) was suspended in 1 liter of purified kerosene in an atmosphere of nitrogen, and oleyl alcohol (2.5 moles per mole of the magnesium chloride) was added. With stirring, the temperature was gradually raised, and the reaction was performed at 130° C. for 1 hour. The solid completely disappeared, and a yellow clear solution was obtained. The solution was cooled to room temperature, and 8.9 g of commercially available Ti(O n-$C_4H_9$)$_4$ was added. But no solid was precipitated, and the solution remained a homogeneous clear solution. In this manner, a solution of a mixture of a magnesium chloride/oleyl alcohol complex and Ti(O n-$C_4H_9$)$_4$ was obtained. The magnesium/titanium mole ratio in the solution was 20.

The polymerization reactor as used in Example 1 was modified so that feed lines for the individual catalyst ingredients got together almost at the same part of a solvent feeding line. Triethyl aluminum and diethyl aluminum monochloride were fed through one of these lines each at a rate of 10.8 millimoles/hr, and the solution of a mixture of a magnesium chloride/oleyl alcohol complex and Ti(O n-$C_4H_9$)$_4$ was fed through another line at a rate of 0.27 millimole/hr calculated as titanium atom. Cyclohexane was continuously fed through the solvent feeding line at a rate of 80 liters/hr. When the catalyst ingredients were mixed, the concentration of titanium was 0.009 millimole/liter, and the concentration of aluminum was 0.74 millimole/liter. The time required from the mixing of the catalyst ingredients to the arrival of the mixture at the polymerization reactor was subjected to about 30 seconds, and the temperature was set at 140° C. Ethylene was continuously fed into the polymerization reactor at a rate of 12.0 kg/hr and continuously polymerized at a temperature of 200° C. and a total pressure of 40 kg/cm$^2$. The molecular weight of the polyethylene was adjusted by continuously feeding hydrogen.

The concentration of the polymer in the solvent was 78.1 g/liter, which corresponded to a polymerization activity of 23,100 g of polyethylene/millimole of Ti. The polyethylene had a density of 0.966 g/cm$^3$ and a melt index of 7.9.

EXAMPLE 26

In the polymerization of ethylene in Example 3, instead of feeding the organoaluminum compound and the solution of a mixture of magnesium chloride/2-ethylhexyl alcohol complex and titanium trichloride separately into the polymerization reactor, the catalyst ingredients were fed such that diethyl aluminum monochloride as a constituent of the aluminum catalyst ingredient was associated with one solvent feeding line (at this time, the concentrations of titanium and aluminum were maintained at 0.01 millimole/liter and 0.6 millimole liter, the temperature reached 140° C., and the time required for the mixture of the catalyst ingredients after association to arrive at the polymerization zone was adjusted to 15 seconds). On the other hand, triethyl aluminum was continuously fed into the polymerization reactor separately. Otherwise, ethylene was continuously polymerized in the same way as in Example 3.

The concentration of the polymer was 120 g/liter, and the polymerization activity was 24,000 g of polyethylene/millimole of Ti. The resulting polymer had a melt index of 2.4 and a density of 0.967 g/cm$^3$.

EXAMPLE 27

Mg(OC$_2$H$_5$)Cl was synthesized in the same way as in Example 5. Fifty grams of Mg(OC$_2$H$_5$)Cl was suspended in 1.5 liters of kerosene, and 192.1 g [1.5 moles per mole of Mg(OC$_2$H$_5$)Cl] was added. The mixture was reacted at 50° C. for 30 minutes. The solid Mg(OC$_2$H$_5$)Cl completely disappeared, and a clear solution was obtained. The solution remained a clear solution at room temperature.

When Ti(OC$_8$H$_{17}$)$_4$ was added at room temperature to the solution of the Mg(OC$_2$H$_5$)Cl/oleyl alcohol complex in such an amount that the Mg/Ti mole ratio reached 10. The solution remained a homogeneous clear solution. Thus, a solution of a mixture of the Mg(OC$_2$H$_5$)Cl/oleyl alcohol and Ti(OC$_8$H$_{17}$)$_4$ was obtained.

Ethylene was continuously polymerized in the same way as in Example 2 except that as catalyst ingredients, 40 millimoles/hr of diethyl aluminum monochloride and 0.5 millimole/hr, calculated as titanium atom, of the solution of a mixture of the Mg(OC$_2$H$_5$)Cl/oleyl alcohol complex and Ti(OC$_8$H$_{17}$)$_4$ were fed continuously.

Polyethylene was obtained at a rate of 7.0 kg/hr, and the polymerization activity was 14,000 g of polyethylene/millimole of Ti. The polymer had a melt index of 0.75, and a density of 0.963 g/cm$^3$.

What we claim is:

1. In a process for producing a polymer or copolymer of an alpha-olefin which comprises continuously polymerizing ethylene or copolymerizing ethylene with an alpha-olefin having from 3 to 12 carbon atoms with from 0 to 5 mole % of a diolefin at a temperature in the range of from about 20° C. to about 350° C. and at a pressure in the range of from about atmospheric pressure to about 100 kg/cm$^2$·G in a hydrocarbon solvent in the presence of a catalyst comprising a transition metal compound and an organoaluminum compound, the improvement comprising

[I] carrying out polymerization or copolymerization in the presence of a catalyst composed of (A) a magnesium compound in the liquid state which is soluble in said hydrocarbon solvent and is free from an organoaluminum compound and a transition metal compound, said magnesium compound being obtained by reacting (i) at least one electron donor selected from the group consisting of alcohols having not less than 6 carbon atoms, organocarboxylic acids having not less than 7 carbon atoms, aldehydes having not less than 7 carbon atoms and amines having not less than 6 carbon atoms with (ii) a halogen-containing magnesium compound, (B) a transition metal compound of titanium or vanadium in the liquid state, and (C) an organoaluminum compound, wherein

[II] said polymerization or copolymerization is carried out while feeding said compound (C) into the polymerization or copolymerization zone separately from other compounds (A) and (B), or while adding a part or the whole of said compound (C) to a liquid mixture of said other compounds (A) and (B) and feeding the resulting mixture into said zone; and, wherein

[III] the mole ratio of the transition metal compound to the halogen-containing magnesium compound is from 0.005 to about 0.5.

2. The process of claim 1 wherein the mole ratio of the electron donor (i) to the halogen-containing magnesium compound (ii) in the magnesium compound (A) is not less than 1.

3. The process of claim 1 wherein in the polymerization or copolymerization zone, the concentration of the transition metal compound in said hydrocarbon solvent is 0.0005 to about 1 millimole/liter calculated as transition metal, and the mole ratio of the organoaluminum compound to the transition metal compound is from about 5 to about 2000.

4. The process of claim 1 wherein the transition metal compound is a titanium compound.

5. The process of claim 4 wherein said titanium compound is a tetravalent titanium compound.

6. The process of claim 1 wherein said polymerization or copolymerization is carried out under such conditions that the resulting polymer or copolymer dissolves in said hydrocarbon solvent.

7. The process of claim 1 wherein the polymerization or copolymerization is carried out while feeding compound (C) into the polymerization or copolymerization zone separately from compounds (A) and (B).

8. The process of claim 1 wherein said halogen-containing magnesium compound (ii) is an anhydrous magnesium dihalide.

9. The process of claim 5 wherein said electron donor (i) is an alcohol having not less than 6 carbon atoms and the halogen-containing magnesium compound (ii) is an anhydrous magnesium dihalide.

* * * * *